(12) United States Patent
Otsuki et al.

(10) Patent No.: US 12,292,731 B2
(45) Date of Patent: May 6, 2025

(54) MOLDING MACHINE MANAGEMENT SYSTEM AND COMPUTER PROGRAM

(71) Applicant: Seiko Epson Corporation, Tokyo (JP)

(72) Inventors: Yoshiaki Otsuki, Matsumoto (JP); Ko Tsukada, Matsumoto (JP); Yusuke Mitsuma, Shiojiri (JP)

(73) Assignee: SEIKO EPSON CORPORATION (JP)

(*) Notice: Subject to any disclaimer, the term of this patent is extended or adjusted under 35 U.S.C. 154(b) by 398 days.

(21) Appl. No.: 17/455,096

(22) Filed: Nov. 16, 2021

(65) Prior Publication Data
US 2022/0155760 A1    May 19, 2022

(30) Foreign Application Priority Data

Nov. 17, 2020   (JP) ................................ 2020-190991

(51) Int. Cl.
*G05B 19/418*       (2006.01)
*B29C 45/76*        (2006.01)

(52) U.S. Cl.
CPC .......... *G05B 19/4185* (2013.01); *B29C 45/76* (2013.01); *G05B 19/4183* (2013.01); *G05B 19/4188* (2013.01); *B29C 2045/7606* (2013.01); *B29C 2945/76993* (2013.01)

(58) Field of Classification Search
CPC ............ G05B 19/4185; G05B 19/4183; G05B 19/4188; B29C 45/76; B29C 2045/7606; B29C 2945/76993; B29C 45/768; B29C 2945/76464

See application file for complete search history.

(56) References Cited

U.S. PATENT DOCUMENTS

| 4,841,364 A * | 6/1989 | Kosaka ............... B29C 45/7626 |
| | | 348/130 |
| 2016/0288318 A1* | 10/2016 | Nakazato ............... B25J 9/1666 |
| 2017/0289646 A1* | 10/2017 | Kanthapanit ........ H04N 5/0675 |
| 2017/0297095 A1* | 10/2017 | Zalameda ............. B29C 64/393 |

(Continued)

FOREIGN PATENT DOCUMENTS

| JP | 2002-166457 A | 6/2002 |
| JP | 2002-370260 A | 12/2002 |
| JP | 6716185 B1 | 7/2020 |

*Primary Examiner* — Thomas C Lee
*Assistant Examiner* — Tyler Dean Hedrick
(74) *Attorney, Agent, or Firm* — Harness, Dickey & Pierce, P.L.C.

(57) ABSTRACT

A molding machine management system includes: an injection molding machine including a mold, an injection unit, and a mold clamping unit; a management server coupled to the injection molding machine via a network; a first camera configured to capture an image of the mold; a second camera configured to capture an image of a drive unit provided in the injection molding machine; and a storage unit that stores first moving image data which is moving image data of the mold captured by the first camera, and second moving image data which is moving image data of the drive unit captured by the second camera, in association with a shot number of the injection molding machine. The management server includes a control unit configured to cause a display unit to display the first moving image data and the second moving image data in association with the shot number.

4 Claims, 6 Drawing Sheets

(56) References Cited

U.S. PATENT DOCUMENTS

| | | | |
|---|---|---|---|
| 2018/0065286 A1* | 3/2018 | Pruitt | B33Y 80/00 |
| 2018/0311878 A1* | 11/2018 | Grimm | B29C 45/768 |
| 2021/0069956 A1* | 3/2021 | Hosotsubo | B29C 45/766 |
| 2021/0365016 A1* | 11/2021 | Hasanian | G01N 29/14 |
| 2021/0400252 A1* | 12/2021 | Dan | H04N 13/239 |

* cited by examiner

FIG. 4

| LOT NUMBER | MOLDING CONDITION | SHOT NUMBER | MOVING IMAGE DATA | MEASUREMENT VALUE | INSPECTION RESULT |
|---|---|---|---|---|---|
| 1 | CONDITION 1 | 1 | MOVING IMAGE DATA 1, 2, 3 | VALUE 1, 2, 3 | OK/NG |
| | | 2 | MOVING IMAGE DATA 1, 2, 3 | VALUE 1, 2, 3 | OK/NG |
| | | 3 | MOVING IMAGE DATA 1, 2, 3 | VALUE 1, 2, 3 | OK/NG |
| | | 4 | MOVING IMAGE DATA 1, 2, 3 | VALUE 1, 2, 3 | OK/NG |
| | | 5 | MOVING IMAGE DATA 1, 2, 3 | VALUE 1, 2, 3 | OK/NG |
| | | 6 | MOVING IMAGE DATA 1, 2, 3 | VALUE 1, 2, 3 | OK/NG |
| | | 7 | MOVING IMAGE DATA 1, 2, 3 | VALUE 1, 2, 3 | OK/NG |
| | | 8 | | | |

522

...

MOLDING MACHINE MANAGEMENT SYSTEM AND COMPUTER PROGRAM

The present application is based on, and claims priority from JP Application Serial Number 2020-190991, filed Nov. 17, 2020, the disclosure of which is hereby incorporated by reference herein in its entirety.

BACKGROUND

1. Technical Field

The present disclosure relates to a molding machine management system and a computer program.

2. Related Art

JP-A-2002-166457 discloses an injection molding machine that determines whether an abnormality has occurred in a mold device based on image data of the mold device captured by a camera and molding conditions. When an abnormality occurs, it is possible to prevent the occurrence of an abnormality such as insufficient filling or thread drawing by changing the molding conditions.

However, when an abnormality occurs in a molded product due to occurrence of disturbance such as application of a load from the outside to a drive unit such as a mold clamping unit provided in the injection molding machine, it is difficult to specify a cause of the abnormality based on the image of the mold device or the molding conditions.

SUMMARY

The present disclosure can be implemented in the following aspects.

According to a first aspect of the present disclosure, a molding machine management system is provided. The molding machine management system includes: an injection molding machine including a mold, an injection unit, and a mold clamping unit; a management server coupled to the injection molding machine via a network; a first camera configured to capture an image of the mold; a second camera configured to capture an image of a drive unit provided in the injection molding machine; and a storage unit that stores first moving image data which is moving image data of the mold captured by the first camera, and second moving image data which is moving image data of the drive unit captured by the second camera, in association with a shot number of the injection molding machine, in which the management server includes a control unit configured to cause a display unit to display the first moving image data and the second moving image data in association with the shot number.

According to a second aspect of the present disclosure, a non-transitory computer-readable storage medium storing a computer program is provided. The computer program causes a computer to implement: a function of acquiring first moving image data which is moving image data of a mold of an injection molding machine including the mold, an injection unit, and a mold clamping unit, and is captured by a first camera, and second moving image data which is moving image data of a drive unit provided in the injection molding machine and is captured by a second camera; a function of causing a storage unit to store the first moving image data and the second moving image data in association with a shot number of the injection molding machine; and a function of causing a display unit to display the first moving image data and the second moving image data in association with the shot number.

BRIEF DESCRIPTION OF THE DRAWINGS

FIG. 4 is a diagram showing a data structure of a moving image database.

DESCRIPTION OF EXEMPLARY EMBODIMENTS

A. First Embodiment

Figure 1:
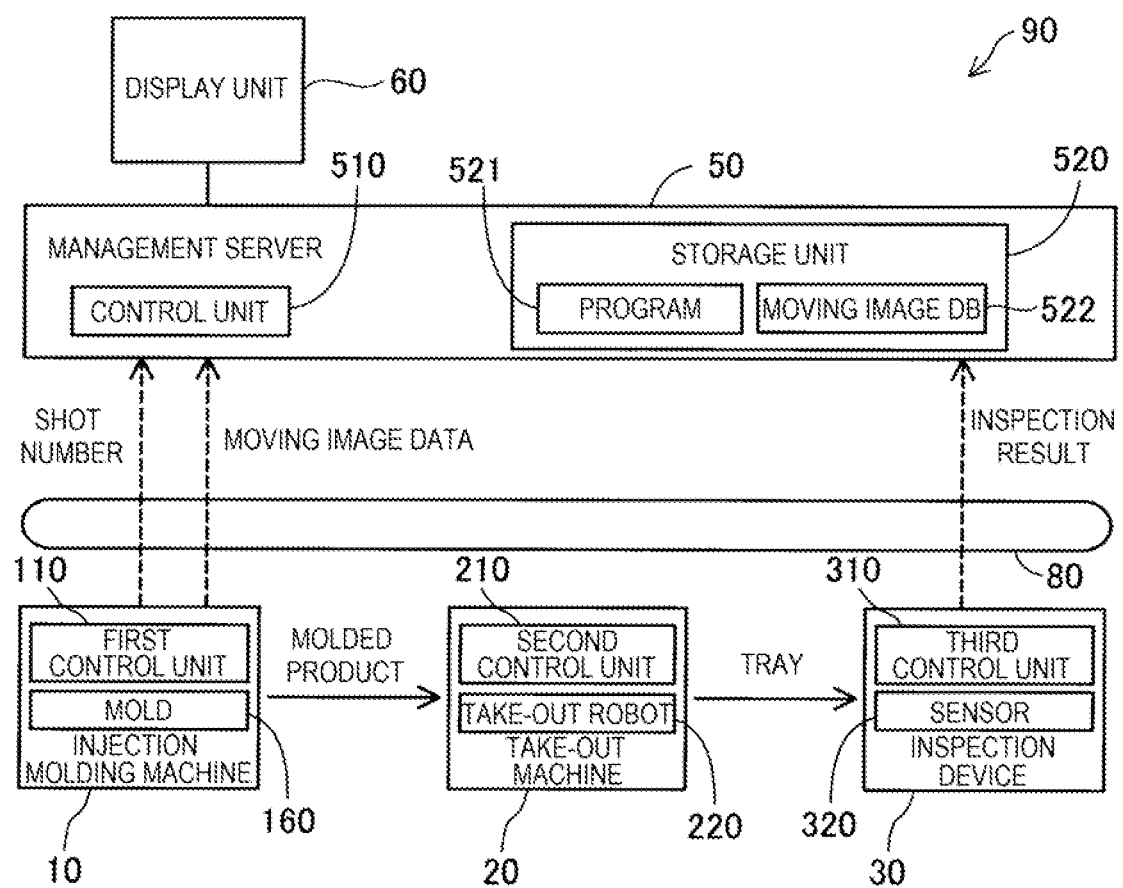
FIG. 1 is a block diagram showing a schematic configuration of a molding machine management system.

FIG. 1 is a block diagram showing a schematic configuration of a molding machine management system 90 according to a first embodiment. The molding machine management system 90 includes an injection molding machine 10 that molds a molded product, a take-out machine 20 that takes out the molded product, an inspection device 30 that inspects the molded product, and a management server 50.

The injection molding machine 10 includes a first control unit 110 and a mold 160. The mold 160 includes a fixed mold and a movable mold. As the mold 160, a metal mold or a resin mold is used. A detailed configuration of the injection molding machine 10 will be described later. The first control unit 110 is configured with a computer including one or a plurality of processors, a memory, and an input and output interface for inputting and outputting signals to and from an outside. The first control unit 110 controls each unit of the injection molding machine 10 to perform injection molding and mold a molded product. A second control unit 210 of the take-out machine 20 and a third control unit 310 of the inspection device 30, which will be described later, have the same configuration as the first control unit 110.

The take-out machine 20 includes the second control unit 210 and a take-out robot 220. The second control unit 210 controls an operation of the take-out robot 220. The take-out robot 220 is a robot that takes out the molded product from the mold 160 of the injection molding machine 10. The take-out robot 220 of the present embodiment grips and takes out the molded product demolded from the mold 160 by an ejector pin provided in the injection molding machine 10 by an end effector attached to a distal end of an arm of the take-out robot. The take-out robot 220 places the extracted molded product on a tray. The tray on which the molded product is placed is conveyed to the inspection device 30 by a conveying device (not shown) or the take-out robot 220.

The inspection device 30 includes the third control unit 310 and a sensor 320. The sensor 320 in the present embodiment is an image sensor. The third control unit 310 controls the sensor 320 to capture an image of the molded product, and analyzes the captured image of the molded product to inspect an appearance of the molded product. The third control unit 310 determines the presence or absence of an abnormality in the appearance for each molded product by the appearance inspection using the image. A determination result of the abnormality is hereinafter referred to as an inspection result. The inspection device 30 transmits the inspection result to the management server 50. The inspection result may include an image used for the inspection. As the sensor 320, various sensors such as a contact type sensor and a non-contact type sensor can be used according to a mode of inspection.

Figure 2:
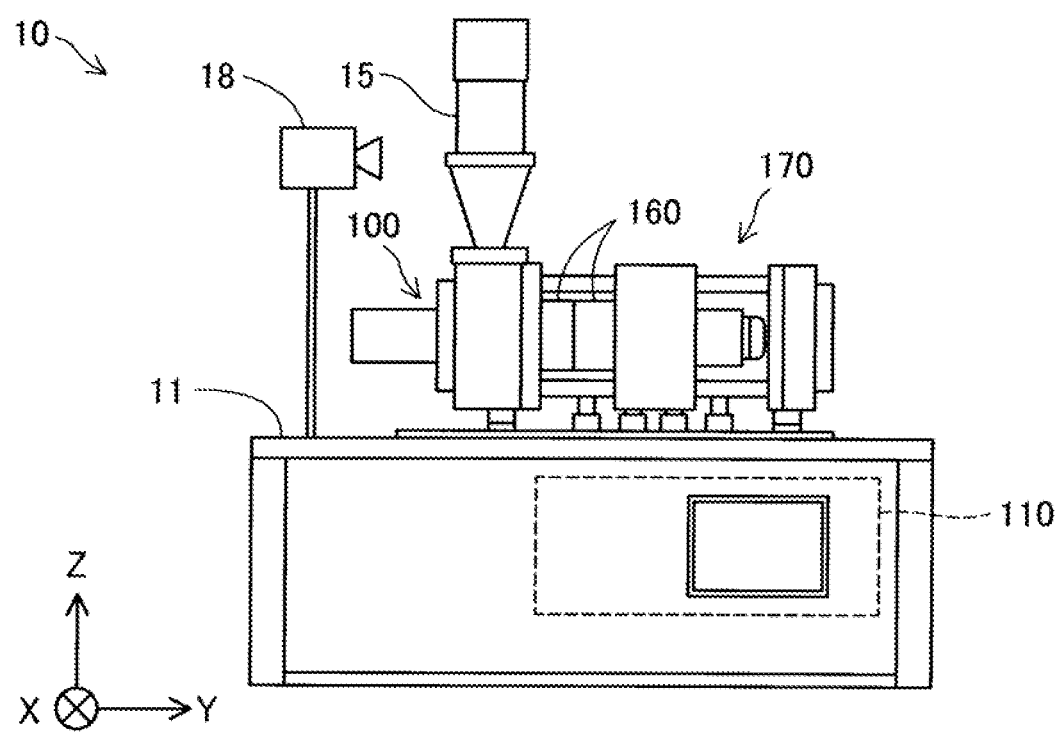
FIG. 2 is a front view showing a schematic configuration of an injection molding machine.

FIG. 2 is a front view showing a schematic configuration of the injection molding machine 10. In FIG. 2, arrows indicating X, Y, and Z directions orthogonal to each other are shown. The X direction and the Y direction are directions parallel to a horizontal plane, and the Z direction is a direction opposite to a gravity direction.

The injection molding machine 10 includes the mold 160, an injection unit 100, and a mold clamping unit 170. The injection unit 100 is also referred to as a plasticizing unit. The mold 160 is attached to the mold clamping unit 170. The injection unit 100 and the mold clamping unit 170 are fixed to a base 11. The base 11 is provided with the first control unit 110.

A material injection unit 15 into which a material of the molded product is injected is coupled to the injection unit 100. The material injection unit 15 in the present embodiment is configured with a hopper that temporarily stores the material. As the material of the molded product, for example, a thermoplastic resin formed in a pellet shape is used. The injection unit 100 plasticizes the material supplied from the material injection unit 15 into a molten material, and injects the molten material into the mold 160 attached to the mold clamping unit 170. The material injection unit 15 is not limited to the hopper, and for example, a tube to which the material is pressure-fed may be applied.

Figure 3:
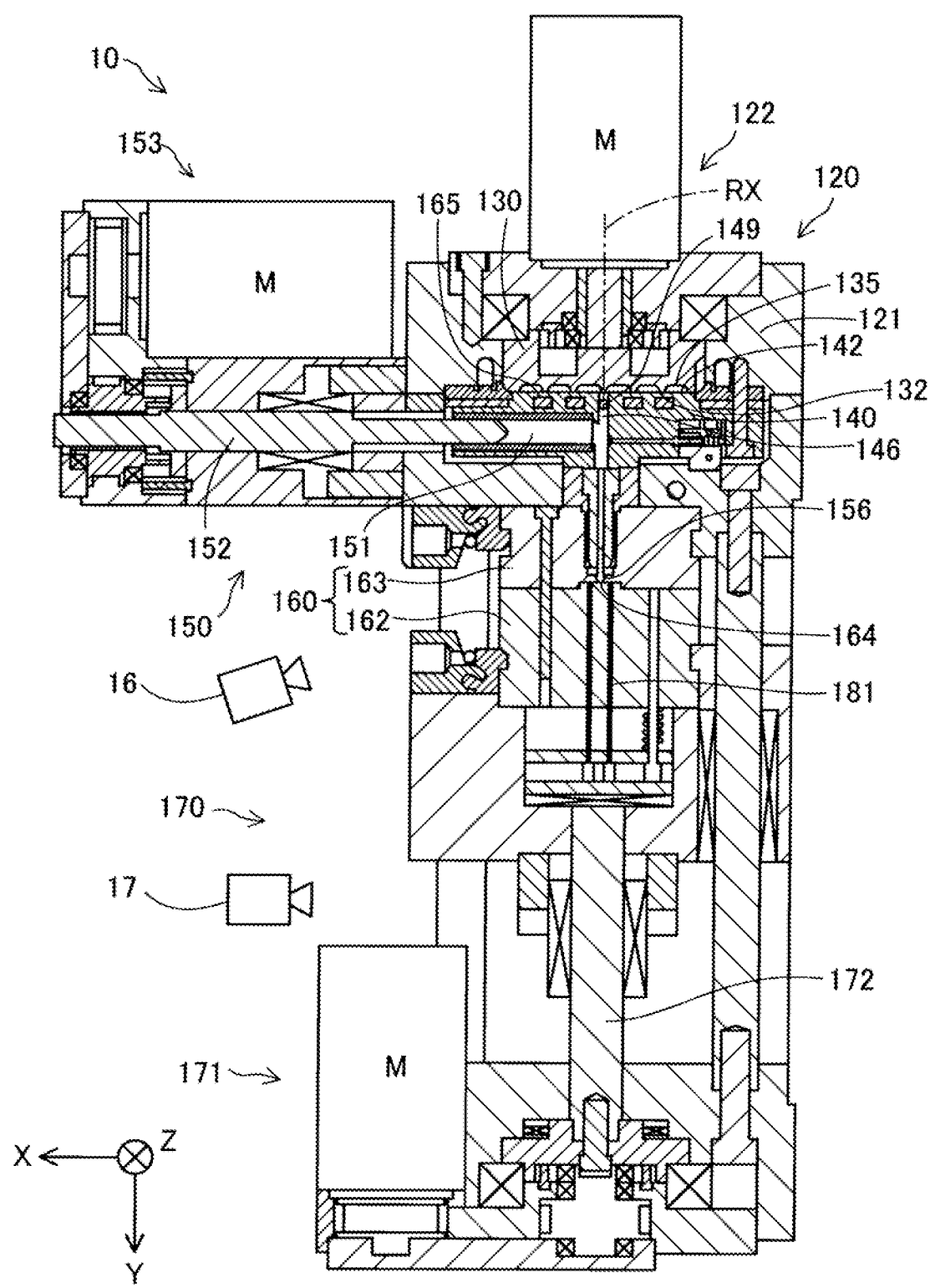
FIG. 3 is an illustrative view showing an internal configuration of the injection molding machine.

FIG. 3 is an illustrative view showing an internal configuration of the injection molding machine 10. X, Y, and Z directions shown in FIG. 3 correspond to the X, Y, and Z directions shown in FIG. 2. The injection unit 100 includes a melting unit 120, an injection control unit 150, and a nozzle 156.

The melting unit 120 includes a case 121, a first drive unit 122, a flat screw 130, a barrel 140, a heating unit 165, and a check valve 149. The melting unit 120 plasticizes at least a part of the material supplied from the material injection unit 15, generates a paste-shaped molten material having fluidity, and guides the molten material to the injection control unit 150.

The flat screw 130 has a substantially cylindrical shape in which a height in a direction along a central axis RX is smaller than a diameter. The flat screw 130 is accommodated in a space surrounded by the case 121 and the barrel 140. The flat screw 130 has a groove forming surface 132 substantially perpendicular to the central axis RX on an end surface facing the barrel 140. A spiral or helical groove 135 is formed on the groove forming surface 132. The groove forming surface 132 of the flat screw 130 faces a facing surface 142 of the barrel 140 substantially perpendicular to the central axis RX. The first drive unit 122 including a motor and a speed reducer is coupled to a surface of the flat screw 130 opposite to the groove forming surface 132. The flat screw 130 is rotated about the central axis RX by a torque generated by the first drive unit 122. The first drive unit 122 is driven under the control of the first control unit 110.

The melting unit 120 plasticizes the material while conveying the material to a communication hole 146 by rotating the flat screw 130 with respect to the barrel 140 while heating, by the heating unit 165, the material supplied between the groove 135 of the flat screw 130 and the barrel 140. Then, the plasticized material flows out from the communication hole 146 to the injection control unit 150 and the nozzle 156. The check valve 149 is provided in the communication hole 146. The check valve 149 prevents backflow of the material from the communication hole 146 to the groove 135 of the flat screw 130.

The injection control unit 150 includes a cylinder 151, a plunger 152, and a second drive unit 153. The cylinder 151 is a substantially cylindrical member coupled to the communication hole 146 of the barrel 140. The plunger 152 moves inside the cylinder 151. The plunger 152 is driven by the second drive unit 153 including a motor, a gear, or the like. The second drive unit 153 is controlled by the first control unit 110.

The injection control unit 150 executes a measuring operation and an injection operation by sliding the plunger 152 in the cylinder 151 under the control of the first control unit 110. The measuring operation is an operation of guiding the molten material in the communication hole 146 into the cylinder 151 and measuring the molten material in the cylinder 151 by moving the plunger 152 in a direction away from the communication hole 146. The injection operation is an operation of injecting the molten material in the cylinder 151 into the mold 160 via the nozzle 156 by moving the plunger 152 in a direction approaching the communication hole 146. The first control unit 110 controls the movement of the plunger 152 so as to achieve an injection pressure determined by the molding conditions.

The nozzle 156 communicates with the communication hole 146. When the above measuring operation and injecting operation are executed, the molten material measured in the cylinder 151 is sent from the injection control unit 150 to the nozzle 156 via the communication hole 146. The nozzle 156 is provided with a heater (not shown), and a temperature of the nozzle 156 is adjusted by controlling the heater by the first control unit 110. Further, the nozzle 156 is provided with a sensor that measures the temperature of the nozzle 156 and the injection pressure of the nozzle 156. The temperature and the injection pressure of the nozzle 156 measured by the sensor are acquired by the first control unit 110 and transmitted to the management server 50.

The molten material sent to the nozzle 156 is injected from the nozzle 156 into a cavity 164 of the mold 160. The mold 160 has a movable mold 162 and a fixed mold 163 facing each other, and has the cavity 164 between the movable mold 162 and the fixed mold 163. The cavity 164 is defined by an uneven shape formed in the movable mold 162 and the fixed mold 163.

A temperature control device (not shown) is coupled to the mold 160. The temperature control device is controlled by the first control unit 110. The first control unit 110 adjusts a temperature of the mold 160 by controlling the temperature control device to cause a heat medium to flow inside or around the mold 160. The mold 160 is provided with a temperature sensor that measures the temperature of the mold 160 and a mold clamping force sensor. A temperature measured by the temperature sensor and a mold clamping force measured by the mold clamping force sensor are acquired by the first control unit 110 and transmitted to the management server 50.

The mold clamping unit 170 includes a third drive unit 171 including a motor and a ball screw 172. The ball screw 172 is coupled to the movable mold 162. The driving of the third drive unit 171 is controlled by the first control unit 110. The ball screw 172 transmits power from the motor to the movable mold 162. The mold clamping unit 170 moves the movable mold 162 by the third drive unit 171 under the control of the first control unit 110, thereby performing a mold clamping operation and a mold opening operation of the mold 160 by the mold clamping force determined by the molding conditions. When the mold 160 is opened, the molded product is released from the cavity 164 by an ejector pin 181.

The injection molding machine 10 includes a first camera 16 that captures an image of the mold 160. The first camera 16 is controlled by the first control unit 110. The first control unit 110 uses the first camera 16 to capture images of the operation of the mold 160 for each shot, more specifically, the operation of the movable mold 162 from mold opening to mold clamping for each shot, and transmits the captured moving image data to the management server 50 as first moving image data.

The injection molding machine 10 includes a second camera 17 that captures an image of the third drive unit 171. The second camera 17 is controlled by the first control unit 110. The first control unit 110 uses the second camera 17 to capture images of the operation of the ball screw 172 for each shot, more specifically, a state of the operation of the ball screw 172 from mold opening to mold clamping for each shot, and transmits the captured moving image data to the management server 50 as second moving image data.

The description returns to FIG. 2. The injection molding machine 10 of the present embodiment includes, in addition to the first camera 16 and the second camera 17, a third camera 18 that captures an image of the material injection unit 15. The third camera 18 is controlled by the first control unit 110. The first control unit 110 uses the third camera 18 to capture a state of material supply in the material injection unit 15 for each shot, and transmits the captured moving image data to the management server 50 as third moving image data.

The description returns to FIG. 1. The management server 50 can communicate with the injection molding machine 10, the take-out machine 20, and the inspection device 30 via a network 80. The network 80 may be, for example, a LAN, a WAN, or Internet. A display unit 60 is coupled to the management server 50. As the display unit 60, for example, a liquid crystal display or an organic EL display is used. In addition, for example, a tablet terminal or a mobile terminal coupled to the management server 50 via the network 80 can be used as the display unit 60.

The management server 50 includes a control unit 510 and a storage unit 520. The control unit 510 is configured with a computer including one or a plurality of processors, a memory, and an input and output interface for inputting and outputting signals to and from an outside. The storage unit 520 stores a computer program 521 for controlling the molding machine management system 90 and a moving image database 522. The control unit 510 causes the management server 50 to implement, by loading the computer program stored in the storage unit 520 into the memory and executing the computer program, a function of acquiring moving image data, a function of recording the moving image data in the moving image database 522 in association with a shot number, and a function of causing the display unit 60 to display the moving image data in association with the shot number. The computer program 521 may be recorded in a computer-readable recording medium such as a memory card or an optical disk.

The control unit 510 acquires the shot number, a measurement value corresponding to the shot number, and the first to third moving image data from the injection molding machine 10 via the network 80. The measurement value include various values measured by the injection molding machine 10, such as the nozzle temperature, the injection pressure, the mold temperature, and the mold clamping force described above. Further, the control unit 510 acquires the inspection result of the molded product in the order of the shot number from the inspection device 30 via the network 80. The control unit 510 records the acquired data and values in the moving image database 522 stored in the storage unit 520.

FIG. 4 is a diagram showing a data structure of the moving image database 522 stored in the storage unit 520. In the moving image database 522, lot numbers are recorded. The lot number is determined according to a manufacturing period such as a manufacturing date, a manufacturing week, or a manufacturing month. In the moving image database 522, molding condition data representing the molding conditions set in the injection molding machine 10 in the lot is associated with the lot number. The molding condition data includes the nozzle temperature, the mold temperature, the injection pressure, the mold clamping force, or the like.

Further, the lot number is associated with the shot number of each shot in which the injection molding is performed in the lot. The shot number is associated with the first moving image data, the second moving image data, and the third moving image data as moving image data. Further, in addition to the moving image data, the measurement value at each shot number acquired from the injection molding machine 10 and the inspection result acquired from the inspection device 30 are associated with each shot number. When the lot number is changed in the management server 50, the control unit 510 of the management server 50 transmits a predetermined command to the injection molding machine 10 to initialize the shot number.

Figure 5:
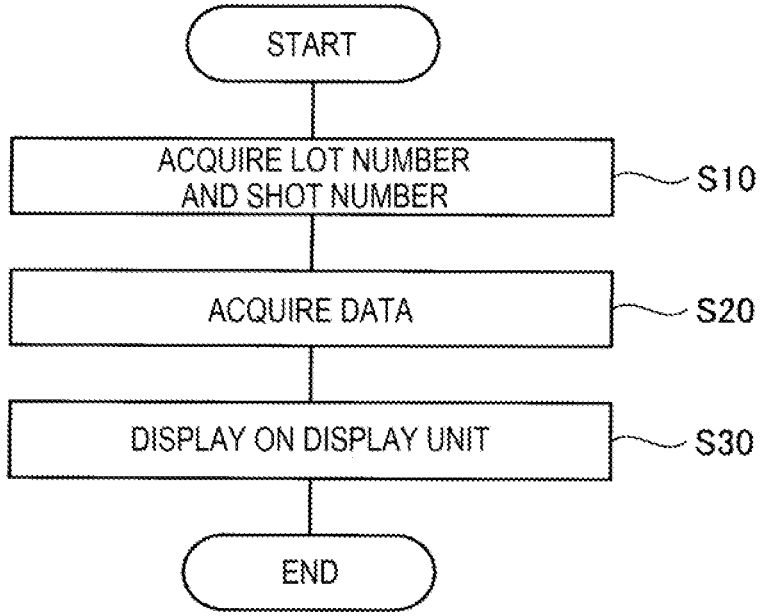
FIG. 5 is a flowchart of moving image display processing.

FIG. 5 is a flowchart of moving image display processing executed by the control unit 510 of the management server 50. This processing is executed when the control unit 510 receives a predetermined operation from an administrator via a predetermined input device such as a touch panel or a mouse coupled to the management server 50. The processing may be executed while a molding cycle is performed or may be executed while the molding cycle is stopped in the molding machine management system 90.

In step S10, the control unit 510 acquires the lot number and the shot number from the administrator via the input device.

In step S20, the control unit 510 acquires, from the moving image database 522 and the molding condition data corresponding to the lot number, the moving image data, the measurement value, and the inspection result corresponding to the lot number and the shot number acquired in step S10.

In step S30, the control unit 510 causes the display unit 60 to display the data acquired in step S20, that is, the moving image data, the measurement value, and the inspection result. Further, the control unit 510 causes the display unit 60 to display the lot number and the shot number acquired from the administrator in step S10 and the molding conditions represented by the molding condition data acquired in step S20.

Figure 6:
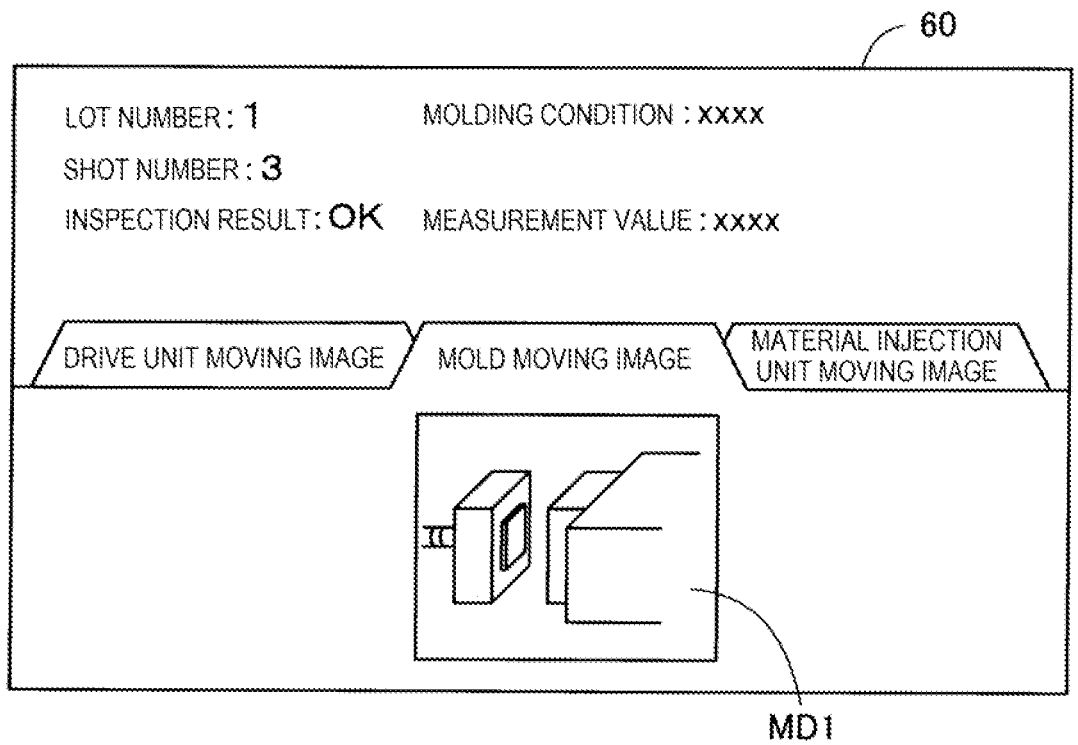
FIG. 6 is a diagram showing an example of a display content of a display unit.

FIG. 6 is a diagram showing an example of a display content of the display unit 60. As shown in FIG. 6, the control unit 510 displays the moving image data acquired from the moving image database 522, that is, the first moving image data, the second moving image data, and the third moving image data on the display unit 60. In the present embodiment, the control unit 510 displays the moving image data of the mold 160 represented by the first moving image data, the moving image data of the ball screw 172 represented by the second moving image data, and the moving image data of the material injection unit 15 represented by the third moving image data in a lower part of the screen in a switchable manner by tab control represented by a graphical interface. That is, in the present embodiment, one piece of moving image data selected by the administrator among the first moving image data, the second moving image data, and the third moving image data is displayed on the display unit 60. FIG. 6 shows an example in which a first moving image data MD1 is displayed. Further, the control unit 510 displays the lot number, the shot numbers, the molding conditions, the inspection results, and the measurement values on the same screen as the moving image data in the upper part of the screen. In addition to these pieces of information, the control unit 510 may cause the display unit 60 to display, for example, a value of a management limit line or a standard value as numerical information used for quality management of the molded product. The management limit line includes an upper management limit line, a center line, and a lower management limit line, and the standard value includes an upper limit standard value and a lower limit standard value.

Figure 7:
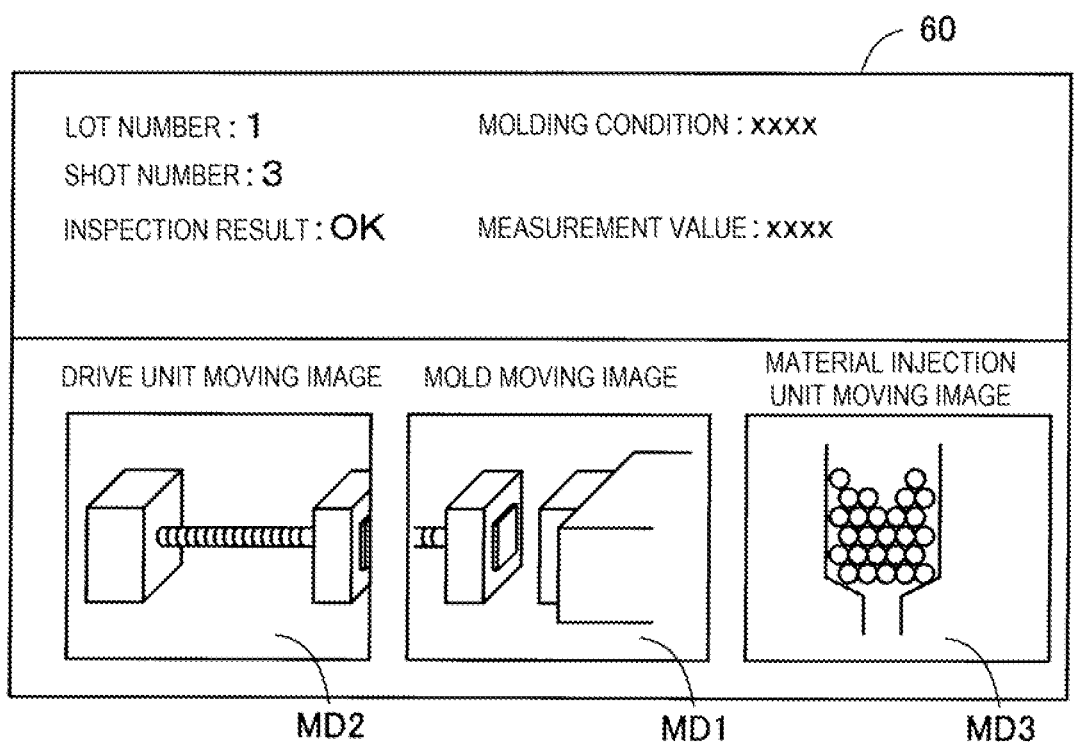
FIG. 7 is a diagram showing another example of the display content of the display unit.

FIG. 7 is a diagram showing another example of the display content of the display unit 60. FIG. 6 shows an example in which the first moving image data, the second moving image data, and the third moving image data are switchably displayed, but the control unit 510 may simultaneously display the first moving image data MD1, second moving image data MD2, and third moving image data MD3 on the same screen as shown in FIG. 7. Further, in addition to such display, for example, the control unit 510 may simultaneously display two pieces of moving image data among the first moving image data MD1, the second moving image data MD2, and the third moving image data MD3 on the same screen and display the remaining one piece of moving image data on another screen. The other screen may be, for example, a display unit different from the display unit 60 or another window displayed on the display unit 60, and at least the first moving image data MD1 and the second moving image data MD2 may be reproduced in synchronization with each other.

According to the molding machine management system 90 of the present embodiment described above, since the moving image data of the mold 160 and the moving image data of the third drive unit 171 are displayed on the display unit 60 in association with the shot number, it is easy to specify a cause of an abnormality when the abnormality occurs in the molded product due to a cause of a molding abnormality that cannot be confirmed only by the moving image data of the mold 160, for example, a cause such as an external load applied to the drive unit provided in the injection molding machine 10. Therefore, it is possible to appropriately formulate a measure for preventing recurrence without taking an ad hoc measure, such as a change in molding conditions, with respect to the molding abnormality. In the present embodiment, the control unit 510 displays the moving image data of the ball screw 172 provided in the injection molding machine 10, and therefore, for example, it is easy for the administrator to specify the cause of the molding failure caused by the contact of foreign matters with the ball screw 172, and it is possible to appropriately deal with the cause.

Further, in the present embodiment, the moving image data of the material injection unit 15 is displayed on the display unit 60 as the third moving image data. Therefore, it is easy to specify a molding abnormality caused by a defect of the material injection unit 15, such as material clogging of the material injection unit 15.

Further, in the present embodiment, the molding conditions of the injection molding machine 10 are also displayed on the same screen as the moving image data. Therefore, when there is a cause of an abnormality in the molding conditions, the cause of the abnormality can be easily analyzed. Further, in the present embodiment, since the inspection result and each measurement value in the injection molding machine 10 are also displayed on the same screen, the cause of the molding abnormality can be analyzed from various viewpoints.

B. Other Embodiments (B1) In the above embodiment, the control unit 510 of the injection molding machine 10 captures an image of the movable mold 162 using the first camera 16 as the first moving image data. On the other hand, the first camera 16 may capture an image of the fixed mold 163. Further, a plurality of first cameras 16 may be prepared, and both the moving image data of the movable mold 162 and the moving image data of the fixed mold 163 may be captured. In this case, the control unit 510 may cause the display unit 60 to switchably display or simultaneously display the moving image data of the movable mold 162 and the moving image data of the fixed mold 163.

(B2) In the above embodiment, the control unit 510 causes the display unit 60 to display the moving image data of the material injection unit 15. However, the display of the moving image data of the material injection unit 15 is not essential. For example, the control unit 510 may cause the display unit 60 to display moving image data of a movable mold, moving image data of a fixed mold, and moving image data of a drive unit without causing the display unit 60 to display the moving image data of the material injection unit 15.

(B3) In the above embodiment, the control unit 510 captures, as the second moving image data, a state of an operation of the ball screw 172 provided in the third drive unit 171. On the other hand, the control unit 510 may capture, as the second moving image data, a state of an operation of the first drive unit 122 or the second drive unit 153 as the drive unit included in the injection unit 100. Accordingly, it is easy to identify a molding abnormality caused by a defect of the drive unit provided in the injection unit 100.

(B4) In the above embodiment, the control unit 510 displays the molding conditions and the moving image data, but the display of the molding conditions is not essential. Further, the control unit 510 may not display the lot number, the inspection result, and the measurement value. These pieces of data may be displayed on a screen different from the screen on which the moving image data is displayed.

(B5) The injection molding machine 10 in the above embodiment includes the flat screw 130 in the injection unit 100. On the other hand, the injection unit 100 may include an in-line screw instead of the flat screw 130. In this case, the second camera 17 captures an image of, for example, a drive unit that rotates a screw or a drive unit that moves the screw in an axial direction.

(B6) In the above embodiment, the storage unit 520 may be provided in a storage device other than the management server 50, for example, a file server or a network attached storage (NAS).

(B7) The first control unit 110 may transmit an imaging start signal to the first camera 16 and the second camera 17 when transmitting a predetermined operation signal of the injection molding machine 10. The predetermined operation signal is, for example, a mold closing operation signal to the mold clamping unit 170, a shot start signal to the plunger 152, a material supply signal to the material injection unit 15, or the like. Accordingly, an imaging start timing of the first moving image data and an imaging timing of the second moving image data can be synchronized with each other at an appropriate timing.

(B8) In the above embodiment, the injection molding machine 10 includes the third camera 18 that captures an image of the material injection unit 15 in addition to the first camera 16 and the second camera 17, but the injection molding machine 10 may include a plurality of cameras in the take-out machine 20 or the inspection device 30.

C. Other Embodiments

The present disclosure is not limited to the above embodiments, and can be implemented by various configurations without departing from the gist of the present disclosure. For example, in order to solve a part or all of the problems described above, or to achieve a part or all of effects described above, technical characteristics in the embodiments corresponding to technical characteristics in aspects to be described below can be replaced or combined as appropriate. The technical characteristics can be deleted as appropriate unless described as essential in the present specification.

(1) According to a first aspect of the present disclosure, a molding machine management system is provided. The molding machine management system includes: an injection molding machine including a mold, an injection unit, and a mold clamping unit; a management server coupled to the injection molding machine via a network; a first camera configured to capture an image of the mold; a second camera configured to capture an image of a drive unit provided in the injection molding machine; and a storage unit that stores first moving image data which is moving image data of the mold captured by the first camera, and second moving image data which is moving image data of the drive unit captured by the second camera, in association with a shot number of the injection molding machine. The management server includes a control unit configured to cause a display unit to display the first moving image data and the second moving image data in association with the shot number.

According to such an aspect, since the moving image data of the mold and the moving image data of the drive unit are displayed on the display unit in association with the shot number, it is easy to specify a cause of an abnormality when the abnormality occurs due to disturbance such as an external load applied to the drive unit provided in the injection molding machine.

(2) In the above aspect, the injection molding machine may include a material injection unit configured to inject a material into the injection unit, and a third camera configured to capture an image of the material injection unit. The storage unit may store the first moving image data, the second moving image data, and third moving image data which is moving image data of the material injection unit, in association with the shot number, and the control unit may be configured to cause the display unit to display the first moving image data, the second moving image data, and the third moving image data in association with the shot number. In such an aspect, it is easy to specify a molding abnormality caused by the material injection unit.

(3) In the above aspect, the drive unit may be provided in the injection unit or the mold clamping unit. In such an aspect, it is easy to specify the molding abnormality caused by the drive unit of the injection unit or the drive unit of the mold clamping unit.

(4) In the above aspect, the control unit may be configured to cause the display unit to display a molding condition of the injection molding machine. In such an aspect, when there is a cause of an abnormality in the molding conditions, the cause of the abnormality can be easily analyzed.

(5) According to a second embodiment of the present disclosure, a non-transitory computer-readable storage medium storing a computer program is provided. The computer program causes a computer to implement: a function of acquiring first moving image data which is moving image data of a mold of an injection molding machine including the mold, an injection unit, and a mold clamping unit, and is captured by a first camera, and second moving image data which is moving image data of a drive unit provided in the injection molding machine and is captured by a second camera; a function of causing a storage unit to store the first moving image data and the second moving image data in association with a shot number of the injection molding machine; and a function of causing a display unit to display the first moving image data and the second moving image data in association with the shot number.

What is claimed is:

1. A molding machine management system, comprising:
an injection molding machine including a molding controller, a mold, an injection unit, a material injection unit, and a mold clamping unit, the molding controller being configured to transmit a predetermined operation signal to operate one of the mold, the injection unit, the material injection unit, and the mold clamping unit;
a management server coupled to the injection molding machine via a network;
a first camera configured to capture a first moving image of the mold in response to an imaging start signal from the molding controller, the first camera being configured with a first sub-camera and a second sub-camera, the mold being configured with a movable mold part and a fixed mold part, the first and second sub-cameras being configured to capture first and second sub-moving images of the movable and fixed mold parts, respectively, the first moving image including the first and second sub-moving images;
a second camera configured to capture a second moving image of a drive unit provided in the injection molding machine in response to the imaging start signal from the molding controller;
a third camera configured to capture a third moving image of a state of a material supplied from the material injection unit to the injection unit;
a take-out robot configured to take a molded product from the injection molding machine;
an inspection device configured to receive the molded product from the take-out robot and inspect an appearance of the molded product formed by the injection molding machine based on an image captured by an imaging sensor to generate an inspection result; and
a memory configured to store first moving image data of the first moving image captured by the first camera, second moving image data of the second moving image captured by the second camera, and third moving image data of the third moving image captured by the third camera, in association with a lot number and a shot number of the injection molding machine, and the inspection result, wherein the molding controller is configured to transmit the imaging start signal to the first and second cameras when the molding controller transmits the predetermined operation signal, the management server includes a controller, the controller is configured to:

receive the first moving image data, the second moving image data, and the third moving image data in association with the lot number and the shot number, and the inspection result from the memory;

cause a display to simultaneously display two data of the first moving image data, the second moving image data, and the third moving image data in a first area of a first screen of the display by tab control in association with the lot number and the shot number and display the remaining one data of the first moving image data, the second moving image data, and the third moving image data in the first area of a second screen of the display by the tab control, the first area being located adjacent to a lower edge of the display; and cause the display to display the inspection result in a second area of the display adjacent to the first area.

2. The molding machine management system according to claim 1, wherein the drive unit is provided in the injection unit or the mold clamping unit.

3. The molding machine management system according to claim 1, wherein the controller is further configured to cause the display to display a molding condition of the injection molding machine.

4. A non-transitory computer-readable storage medium storing a computer program for causing a computer to execute a process by a processor so as to perform the steps of:

acquiring first moving image data which is a first moving image of a mold of an injection molding machine including a molding controller, the mold, an injection unit, a material injection unit, and a mold clamping unit, and is captured by a first camera in response to an imaging start signal from the molding controller, the molding controller being configured to transmit a predetermined operation signal to operate one of the mold, the injection unit, the material injection unit, and the mold clamping unit, the first camera being configured with a first sub-camera and a second sub-camera, the mold being configured with a movable mold part and a fixed mold part, the first and second sub-cameras being configured to capture first and second sub-moving images of the movable and fixed mold parts, respectively, the first moving image including the first and second sub-moving images;

acquiring second moving image data which is a second moving image of a drive unit provided in the injection molding machine and is captured by a second camera in response to the imaging start signal from the molding controller;

acquiring third moving image data which is a third moving image of a state of a material supplied from the material injection unit to the injection unit and is captured by a third camera;

taking a molded product from the injection molding machine by a take-out robot;

acquiring an inspection image of the molded product formed by the injection molding machine;

obtaining an inspection result of inspecting an appearance of the molded product based on the inspection image;

causing a memory to store the first moving image data, the second moving image data, and the third moving image data in association with a lot number and a shot number of the injection molding machine, and the inspection result;

causing a display to simultaneously display two data of the first moving image data, the second moving image data, and the third moving image data in a first area of a first screen of the display by tab control in association with the lot number and the shot number and display the remaining one data of the first moving image data, the second moving image data, and the third moving image data in the first area of a second screen of the display by the tab control, the first area being located adjacent to a lower edge of the display; and causing the display to display the inspection result in a second area of the display adjacent to the first area, wherein the molding controller is configured to transmit the imaging start signal to the first and second cameras when the molding controller transmits the predetermined operation signal.

* * * * *